US008082319B2

(12) United States Patent
Disario et al.

(10) Patent No.: US 8,082,319 B2
(45) Date of Patent: Dec. 20, 2011

(54) PUBLISHING AND SUBSCRIBING TO DIGITAL IMAGE FEEDS

(75) Inventors: Aaron Disario, Milpitas, CA (US); Joshua Fagans, Redwood City, CA (US); Christopher N. Ryan, Mountain View, CA (US); Jeffrey Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1178 days.

(21) Appl. No.: 11/329,355

(22) Filed: Jan. 9, 2006

(65) Prior Publication Data

US 2007/0159651 A1    Jul. 12, 2007

(51) Int. Cl.
*G06F 15/16* (2006.01)

(52) U.S. Cl. ...................................................... 709/217

(58) Field of Classification Search .................. 709/201, 709/217, 219, 231
See application file for complete search history.

(56) References Cited

U.S. PATENT DOCUMENTS

| | | | |
|---|---|---|---|
| 7,177,872 B2 * | 2/2007 | Schwesig et al. ........................ 1/1 |
| 2004/0044863 A1 * | 3/2004 | Trimmer et al. ............... 711/161 |
| 2004/0073605 A1 * | 4/2004 | Conley, Jr. ..................... 709/203 |
| 2005/0060316 A1 * | 3/2005 | Kamath et al. ..................... 707/9 |
| 2006/0129917 A1 * | 6/2006 | Volk et al. ...................... 715/513 |
| 2006/0148500 A1 | 7/2006 | Glenner et al. |
| 2006/0173985 A1 * | 8/2006 | Moore ............................ 709/223 |
| 2006/0189349 A1 * | 8/2006 | Montulli et al. ............ 455/556.1 |
| 2006/0195902 A1 * | 8/2006 | King et al. ........................ 726/21 |
| 2006/0235700 A1 * | 10/2006 | Wong et al. ..................... 704/275 |
| 2006/0248209 A1 * | 11/2006 | Chiu et al. ..................... 709/231 |
| 2006/0265409 A1 * | 11/2006 | Neumann et al. ............. 707/100 |
| 2006/0265503 A1 * | 11/2006 | Jones et al. .................... 709/227 |
| 2007/0117586 A1 * | 5/2007 | Billmaier et al. .......... 455/552.1 |
| 2007/0130589 A1 * | 6/2007 | Davis et al. ...................... 725/62 |
| 2008/0005064 A1 * | 1/2008 | Sarukkai ........................... 707/3 |

OTHER PUBLICATIONS

PCT Notification Concerning Transmittal of International Preliminary report on Patentability, dated Jul. 24, 2008, 7 pages.
Hambi, Bambi, "Podcasting Made Easy on Mac With Feeder, iPodderX.", XP-002429341, retrieved from website: <http://mac360.com/index.php/mac360/comments/podcasting_made_easy_on_mac_with_feeder_rss_too>, dated Feb. 10, 2005, 3 pages.
Feedburner, "Seven New Feedburner Features", XP-002429340, The Official FeedBurner Weblog, retrieved from website: <http://blogs.feedburner.com/feedburner/archives/001299.html>, dated Jul. 1, 2005, 2 pages.
BLOG.FORRET.COM, "RSS with images: picture podcasting", XP-002429339, blog.forret.com, retrieved from website: <http://blog.forret.com/2005/06/rss-with-images-picture-podcasting>, dated Jun. 20, 2005, 3 pages.
Claims, PCT/US2007/000488, 5 pages.
International Search Authority, "Notification of Transmittal of the International Search Report and the Written Opinion of the International Searching Authority, or the Declaration", PCT/US2007/000488, dated Apr. 27, 2007, 11 pages.

* cited by examiner

*Primary Examiner* — Faruk Hamza
*Assistant Examiner* — Jason Recek
(74) *Attorney, Agent, or Firm* — Hickman Palermo Truong & Becker LLP

(57) ABSTRACT

Techniques are provided for publishing digital image feeds, where the feeds are automatically created and uploaded to a server along with the images described in the feed, along with techniques for subscribing to digital image feeds, where the feed is downloaded and the images described therein are automatically downloaded and organized. The feeds may be subscribed to and automatically updated.

29 Claims, 9 Drawing Sheets

PUBLISHING AND SUBSCRIBING TO DIGITAL IMAGE FEEDS

FIELD OF THE INVENTION

The present invention relates to sharing digital images, and more specifically, to a user interface technique for publishing and subscribing to digital image feeds.

BACKGROUND

The wide availability of digital cameras, along with the ease and economy they provide with regard to taking pictures, has increased exponentially the number of people taking digital photographs and the number of photographs they take.

One reason people take photographs is to share them with other people. Before the advent of digital camera technology, people would either put photos in albums and share the albums, or have the photos reprinted and give the reprints to friends and family. Now, because a digital photograph is simply a collection of digital bits, the act of sharing digital photos should be easy.

This is not always the case. Several problems exist that impede the easy sharing of digital photographs. A popular means of sharing photographs is via e-mail attachments. While this can be easy, it does require knowledge of computer concepts beyond that of many computer users. It also requires software capable of sending, receiving and displaying the images. Not all available software is user-friendly, nor does all available software display the received images at an optimal resolution. Also, people are wary of e-mail attachments because of the threat of computer viruses. People are apt to take many more digital photographs than film photographs, due to the negligible cost of additional images. While this often makes for better images, it is not feasible to transmit all the images via e-mail due to the file sizes and transmission speeds. Therefore, users must often choose particular images to e-mail, which takes time.

Therefore, sending digital images via e-mail has significant shortcomings. Another method of sharing photographs is uploading the digital images to a server, creating a web page to display the images, and alerting people of the URL for your web page. The drawbacks to this approach are obvious. It requires knowledge of HTML, file transfer protocols, and other advanced topics. In lieu of that, specialized software packages exist which aim to ease the difficulty of creating web pages. These packages often have a steep learning curve or high price, and still do not address the drawback of needing a server to which the images can be uploaded.

While the prior approaches may occasionally serve the purpose of sharing digital images, there exists a need for a technique that allows an easy and straightforward approach to sharing digital images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
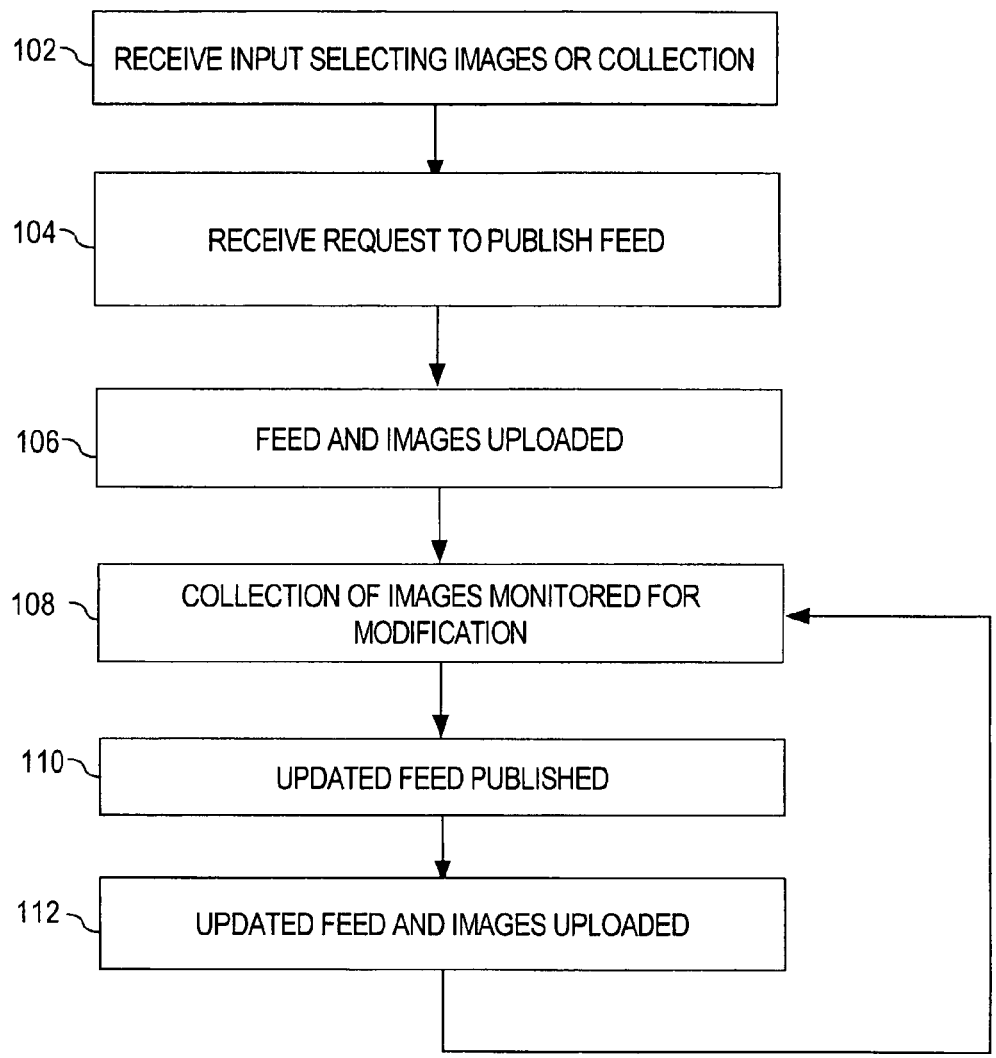
FIG. 1 is a flowchart illustrating a procedure for publishing a digital image feed, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For illustrative purposes, the invention is described in connection with a mechanism for publishing and subscribing to syndication feeds. Various specific details are set forth herein and in the Figures, to aid in understanding the present invention. However, such specific details are intended to be illustrative, and are not intended to restrict in any way the scope of the present invention as claimed herein. In addition, the particular screen layouts, appearance, and terminology as depicted and described herein are intended to be illustrative and exemplary and in no way limit the scope of an invention as claimed.

One embodiment of the present invention is implemented in a conventional personal computer system, such as an iMac, Power Mac, or PowerBook (available from Apple Computer, Inc. of Cupertino, Calif.), running an operating system such as Mac OS X (also available from Apple Computer, Inc.). It will be recognized that an embodiment can be implemented on other devices as well, such as handhelds, personal digital assistants (PDAs), mobile telephones, consumer electronics devices, and the like. One embodiment of the invention is embodied in the iPhoto software package (available from Apple Computer, Inc. of Cupertino, Calif.), running an operating system such as Mac OS X (also available from Apple Computer, Inc.). The invention can be embodied in other software that runs on the personal computer. Embodiments of the invention can be included as add-on software, or it can form part of the operating system itself, or it can be a feature of an application that is bundled with the computer system or sold separately. The various features of embodiments of the invention as described herein include output presented on a display screen that is connected to the personal computer. In addition, embodiments of the invention make use of input provided to the computer system via input devices such as a keyboard, mouse, touchpad, or the like. Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device.

Overview

Techniques shall be described hereafter for automatically publishing and subscribing to digital image syndication feeds, or "feeds," which are a collection of digital images formed to transfer and update between computers. In one embodiment, a technique for automatically creating a feed relating to a collection of digital images is provided. Using this technique, users can easily share digital images leveraging feed-based technology without knowing any details relating to the implementation of the technology.

A syndication feed may be a list-oriented document, located on a server which may or may not be publicly accessible, that can be easily updated. The entries in the list contain information such as comments or news articles, references to external sources of data such as other web pages or files, and extra data, or "metadata," which may be used to further describe the list or the contents of an entry, or as instructions to the software used to read the list. Entries in the list can be added and removed. A subscription to the feed can be created to see the current contents of the list and, in some embodiments, keep track of changes in the contents of the list.

In one embodiment, the feed is uploaded to a server or a node in a peer-to-peer network, and a URL identifying the feed may be distributed to other computer users. In another embodiment, a technique for automatically receiving and subscribing to the syndication feed relating to a collection of digital images is provided. In one embodiment, the syndication feed is automatically received and the digital images described by the feed are automatically downloaded and organized into a collection. In one embodiment, the feed is automatically checked at regular intervals, and any modifications are discovered and additional or modified images are automatically downloaded.

Publishing a Digital Image Syndication Feed

FIG. 1 is a flowchart 100 illustrating the steps of publishing a digital image syndication feed, according to one embodiment of the invention. In step 102, input is received selecting at least one digital image. According to an embodiment, the digital image is stored on the publisher's computer system. In one embodiment, input is received selecting a collection of digital images. This "collection" is a group of digital images and is also referred to herein as an "album." The digital images comprising the collection may have been automatically grouped according to properties such as date of import, date of creation, or any other property capable of being stored and read. In one embodiment, the collection simply is a group of photos organized for ease of location by a user.

For example, a user may have a library of over 1,000 images. The user creates a collection of images named "Wedding," which would consist of all images taken at a wedding, a subset of the 1,000 image library. These images may be associated with the collection by a user, or the collection may be automatically created at the import of the images, named by the user, and thereafter maintained by the user. The user could add images from several different sources to the "Wedding" collection, which offers the user easy access to all images taken at or otherwise relating to the wedding. While the images associated with the "Wedding" collection are part of the 1,000 image library, instead of viewing all 1,000 images in the library to find the wedding images, by selecting the "Wedding" collection to view the user is presented with only those images of the 1,000 that have been associated with the "Wedding" collection. The advantages of this approach are apparent.

In step 104, the system receives a request to publish a feed in a syndicated content format such as XML and publishes the feed. The feed may be published in any number of ways. In one embodiment, the feed is described by Resource Description Framework (RDF) statements and/or encoded using extended Markup Language (XML). Syndication XML refers to XML that has been developed for feeds, such as Atom and RSS ("Really Simple Syndication," "Rich Site Summary," or "RDF Site Summary"). Syndicated content formats are formats for providing a list of discrete items. RSS is currently the standard.

In addition to the title and URL, a description may be included with the list of discrete items. The syntax used to define lists of items and to identify particular items can vary depending on the particular format used, such as Atom and RSS. RSS files create a data feed to which users may subscribe in various methods.

In one embodiment, the feed comprises a list of items that correspond to the digital images chosen in step 102. In one embodiment, these images are part of a collection. In one embodiment, a title and URL are included in the list for each digital image, although additional information may be included, such as data describing properties of a digital image. For example, in one embodiment, each image in the collection is described with a title, a URL at which the image may be accessed, the size of the image, the creation and modification date of the image, and any other information capable of being created and stored.

In one embodiment, the feed describes authentication information. For example, a user may specify a user name and password required to be provided by a client in order to subscribe to the feed. Other embodiments are envisioned wherein the authentication information comprises any method known in the art, such as digital certificates. In another embodiment, authentication is managed by the web server in the form of access protections on the files themselves. Authentication, in this embodiment, is part of the HTTP standard.

In one embodiment, the feed is published in response to user input. For example, a user may select a collection of images and activate a Graphical User Input (GUI) element, such as clicking a button, and the feed is automatically created based upon this user input.

According to one embodiment, prior to creation of the feed, user input is received specifying properties for the images to be uploaded. In one embodiment, upon requesting that a feed describing a collection of images be published, a user may specify that the images be resized prior to uploading. This resizing affects the quality of the image, because the size of the image is a function of the number of pixels making up the image in a vertical and horizontal direction. More pixels correspond to higher quality. If the number of pixels is reduced, quality decreases.

In one embodiment, the user may specify the size of the uploaded images in pixel dimensions. In another embodiment, the sizes are predetermined and selectable by the user. For example, four sizes, each pertaining to a horizontal and vertical size in pixels, may be available: Actual Size, Large, Medium and Small. Actual size means the images are uploaded at the same resolution as they are maintained. This allows subscribers to see the identical images as maintained by the publisher. In one embodiment, the predetermined sizes correspond to sizes that scale well to certain sizes of photos. For example, an image size of 1600 pixels by 1200 pixels is optimal for printing a 4" by 6" image.

In one embodiment, the resizing is accomplished without permanently altering the original images. In one embodiment, an image with a size in pixels of 1600 by 1200 may be automatically resized to 640 pixels by 480 pixels, the 640 by 480 image uploaded to the server, and the image on the user's system left at the 1600 by 1200 size.

In one embodiment, a compression quality may be specified by the user. Digital images can be compressed to save significant disk space while reducing the quality of the image. The user could specify to use no compression which would maintain the original quality of the image, some compression which would reduce the file size yet only nominally affect the quality of the image, or much compression which would significantly reduce the file size and may significantly affect the quality of the image.

In step 106, the published feed and the digital image files selected in step 102 and described in the feed are uploaded to a server accessible via the Internet. According to an embodiment, the information identifying the server location may be prestored by the user. In another embodiment, the location is requested each time a feed is published and uploaded.

According to one embodiment, the server is a node in a peer-to-peer file transfer network that does not have the notion of clients or servers, but only equal peer nodes that simultaneously function as both "clients" and "servers" to the other nodes on the network. This model of network arrangement differs from the client-server arrangement where communication is usually to and from a central server.

According to an embodiment, upon successful uploading of the feed and images, feedback is provided to the user. In various embodiments, this feedback comprises methods invoking properties of a GUI, such as a dialog box. In one embodiment, this feedback comprises a message communicating the successful uploading of the feed and images. In one embodiment, the message also comprises the URL at which the feed may be located. Third parties, with whom the publisher desires to share the feed, may access the feed at this URL.

It would be advantageous to provide a simple method of announcing the URL to the third parties, and according to an embodiment, user input may be received operable to create an e-mail message containing the URL and, if authentication of the client accessing the feed has been requested, the e-mail may contain the authentication information needed to access the feed, such as a user name and password. In one embodiment, the e-mail is in HTML format such that the included URL may be "clicked" upon by the recipient of the e-mail. In one embodiment, in response to the user input requesting the creation of an e-mail message, the e-mail is automatically created and sent either automatically or in response to user input.

According to an embodiment, a file is uploaded to the server along with the feed and images. This file identifies whether a client connecting to the feed on the server possesses software and/or hardware compatible with a mode of operation wherein the feed is automatically subscribed and constantly updated, as described further herein. In one embodiment, this file is in communication with the client accessing the feed and operates to determine whether the client possesses a compatible version of the iPhoto software package (available from Apple computer, as previously described). According to an embodiment, the file causes the compatible software on the client to be executed and access the feed. In one embodiment, the file is a Javascript executable file. The file may also be placed on the server by the administrator of a server to be used by many feeds existing on that server. It may also be embedded within another document, such as an HTML or XML document. It can also be used to provide instructions to the client on how to access the feed or images.

In step 108, the collection of images described by the feed is monitored for modification after the initial feed is published and uploaded. If the collection of images changes, such as by adding images to the collection, deleting images from the collection, or changing properties (size, brightness, crop area) of an image in the collection, then this modification is detected by the system. According to an embodiment, the collection is monitored at regular intervals. In another embodiment, the modifications are detected immediately. In another embodiment, user input is received that causes the collection to be examined for modifications.

In step 110, in response to the modification of the collection, an updated feed is published. In one embodiment, user input is received requesting the publishing of the updated feed and the uploading of the feed and images. In one embodiment, this updated feed consists of a new XML file. In one embodiment, this updated feed defines a list of items corresponding to all the images in the collection; therefore, any changes will be captured in the updated feed. In another embodiment, only the modifications are captured in the updated feed, and the original and modified feeds are combined to reflect the modifications in the collection.

In step 112, the updated feed and the digital image files described by the feed are uploaded to a server accessible via the Internet or on a local or private network. Instead of a server, the files could be transmitted via peer-to-peer networking. According to one embodiment, only the new and/or modified images are uploaded in order to save transmission bandwidth. If sizing, compression, or other options are changed by the user, all of the images may or may not be uploaded again, conforming to the changed options.

According to an embodiment, after publishing and uploading the updated feed, the system returns to step 108, and steps 110 and 112 are repeated whenever modifications are detected to the collection described by the feed.

Figure 2:
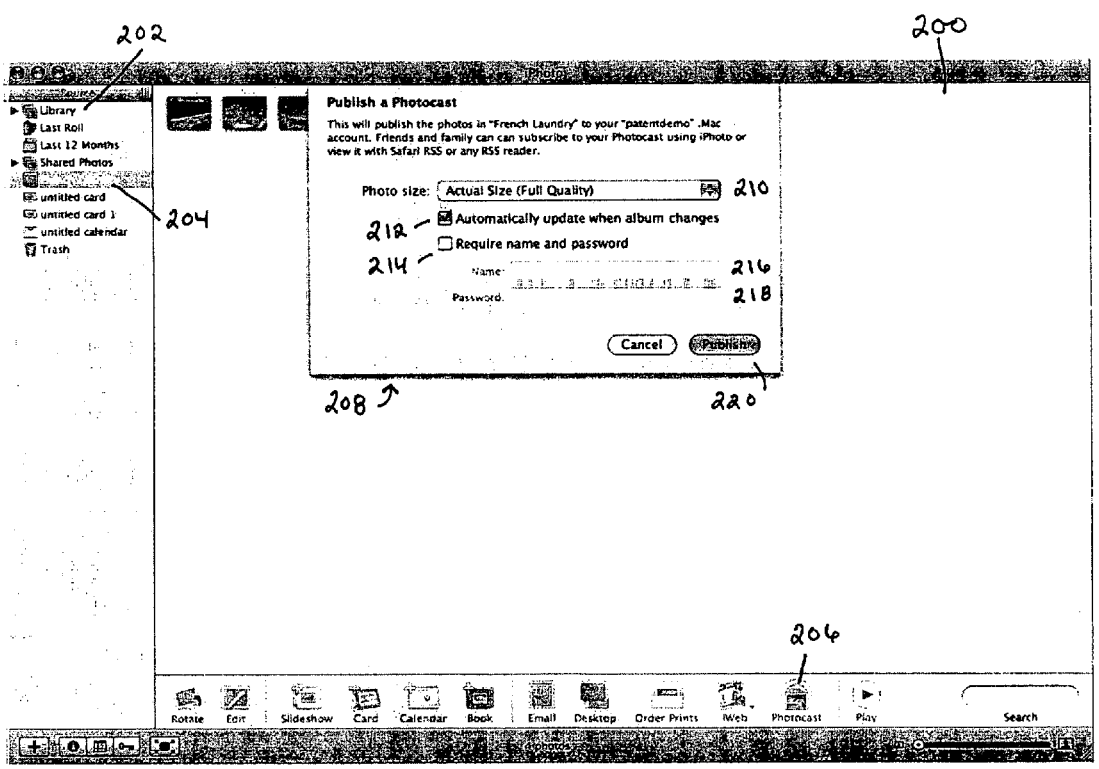
FIG. 2 is a block diagram illustrating an embodiment of the invention.

FIG. 2 illustrates an embodiment of the invention utilizing the iPhoto software package, as described earlier, but it should be understood that the techniques described herein may be embodied in other software that runs on the personal computer.

In FIG. 2, the digital image system 200 maintains a list of organizational elements to aggregate images managed by the system. For example, the system in FIG. 2 contains a Library 202 comprising the entire number of images available for display at any given time. The system also contains collections of images, such as "French Laundry" 204. In this example, the "French Laundry" collection contains a subset of images available in the Library 202. In this example, the collection is highlighted, indicating that it is the selected collection and the displayed images belong to that collection.

While the collection is highlighted, the "Photocast" button 206 may be activated. In response, a dialog box 208 is displayed requesting user input. The user input requested consists of a dropdown selection menu for photo size 210. By selecting a predetermined size from the list 210, the images to be uploaded to the server will be resized such that no photo has dimensions greater than the selection 210. In other embodiments, one of the items on the list corresponds to a manual entry of a custom size.

In this example, "Actual Size" is selected. User input is requested indicating whether the feed should be automatically updated 212 when the collection, or album, changes. By affirmatively checking this option, the automatic update techniques described herein are activated. By deselecting this option, the automatic update techniques described herein are deactivated, and any updates to the feed must be manually requested as described herein. User input may also be requested regarding whether authentication is required 214 of a client attempting to access the feed. In this example, a name 216 and password 218 may be entered, although other embodiments are envisioned where alternate methods of authentication are permitted. According to an embodiment, this authentication information is included with the feed in a manner operable to activate the authentication techniques. Access protections may be placed upon the files and the computer hosting the file will use existing authentication standards to allow access to the files.

After providing the requested input and selecting the "Publish" button 220, the feed is published, and the feed and images are uploaded to the server. Upon successful completion of the publishing and uploading, a user may be presented with feedback similar to FIG. 3. In one embodiment, there is a progress indicator of some sort while the feed and images are being uploaded. The progress indicator may be in the form of a dialog with an incrementing or indefinite progress bar, or it may be some other indicator in the UI reflecting that the upload operation is in progress. In some embodiments, the user can activate a button or click the progress indicator to pause, resume or cancel publishing.

Figure 3:
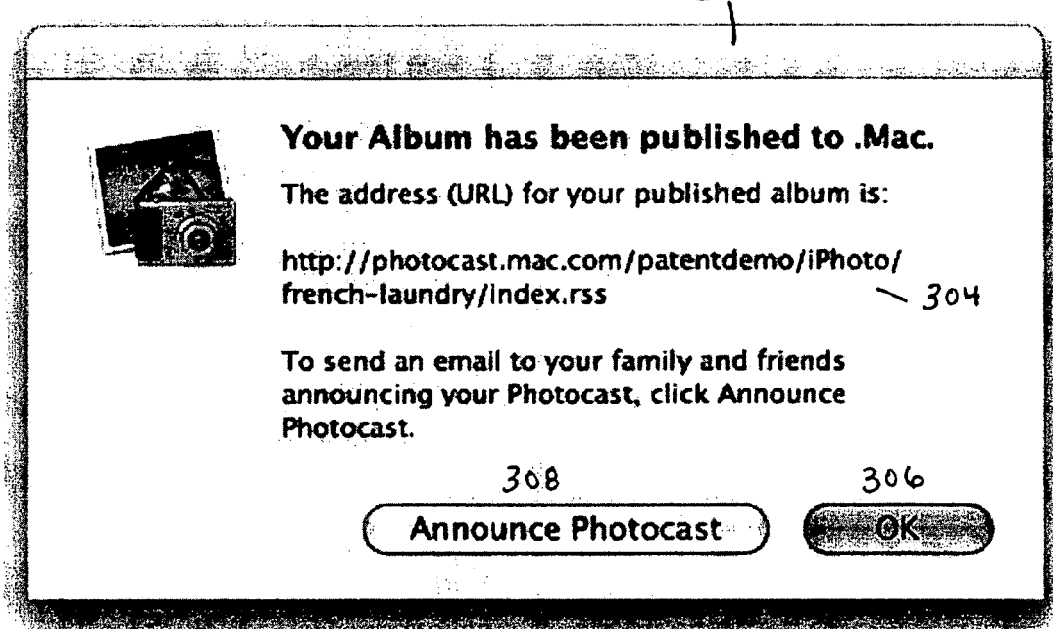
FIG. 3 is a block diagram illustrating an embodiment of the invention.

FIG. 3 illustrates an embodiment of the invention utilizing the iPhoto software package. In FIG. 3, a dialog box 302 or similar GUI element is presented to the user. The feedback communicates the successful completion of the publishing and uploading steps, and provides a URL for the published feed 304. According to techniques known in the art, this URL may be copied and pasted into a document such as an e-mail. According to this embodiment, the user is presented with an option to send an e-mail to third parties announcing the availability of the feed, or "Photocast." The user may dismiss the dialog box by clicking the "OK" button 306. According to an embodiment, by selecting the "Announce Photocast" button 308, an e-mail is created announcing the availability of the Photocast. This e-mail may be created in a different application, such as an e-mail application, by utilizing methods of inter-application communications known in the art.

Figure 4:
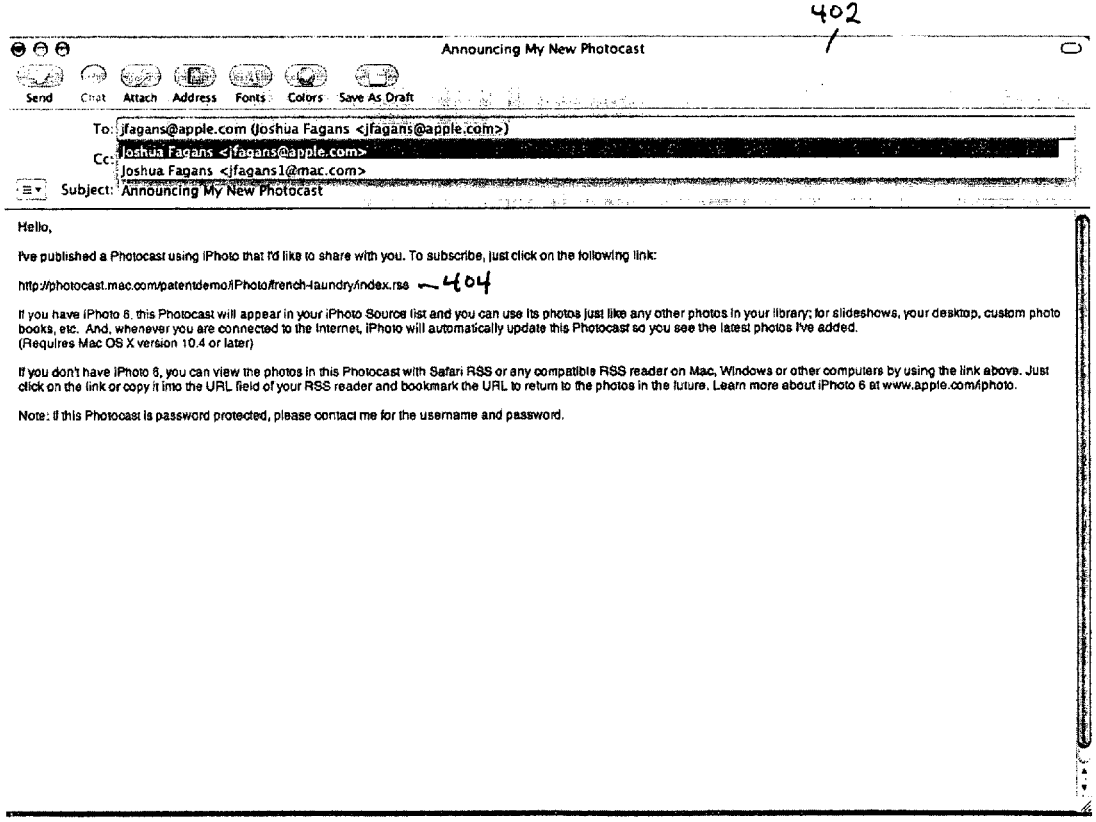
FIG. 4 is a block diagram illustrating an embodiment of the invention.

FIG. 4 illustrates an embodiment of the invention utilizing the iPhoto and "Mail" software packages, available from Apple Computer as previously discussed. In FIG. 4, the e-mail 402 created by selecting the "Announce Photocast" button 308 in FIG. 3 is displayed. It is envisioned that the actual e-mail may consist of any number of variations, and that the example in FIG. 4 is not intended to restrict in any way the scope of the present invention as claimed herein.

The e-mail 402 in FIG. 4 contains the URL 404 for the published feed. According to an embodiment, the URL 404 is formatted as a clickable hyperlink, as to allow a reader of the e-mail to click on the URL 404 and be taken to the feed. According to an embodiment, clicking on the link may also operate to execute an application configured to automatically subscribe to the feed, as described below.

Subscribing to a Digital Image Syndication Feed

Figure 5:
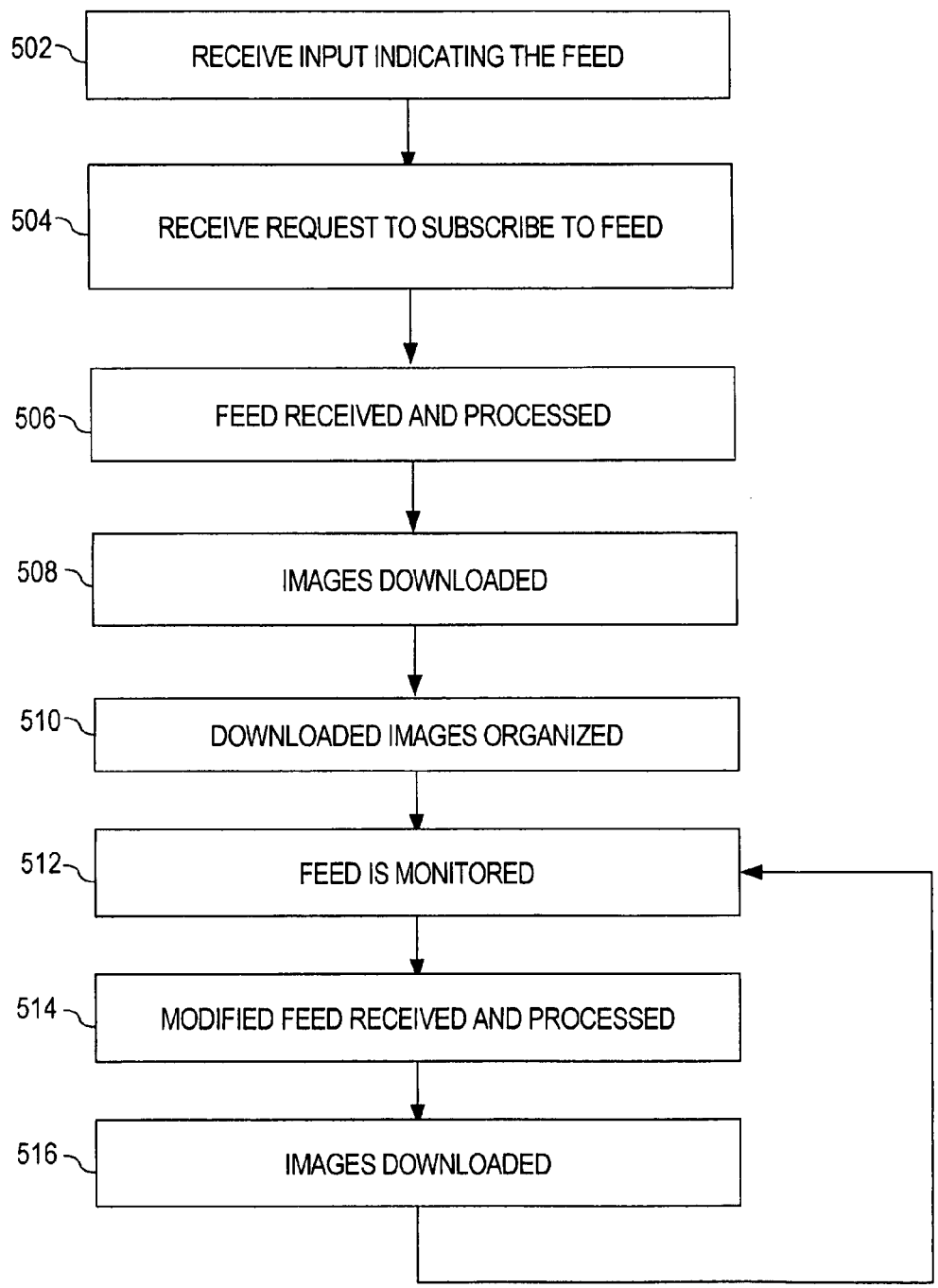
FIG. 5 is a flowchart illustrating a procedure for subscribing to a digital image feed, according to one embodiment of the invention.

FIG. 5 is a flowchart 500 illustrating the steps of subscribing to a digital image syndication feed, according to one embodiment of the invention. In step 502, input is received announcing the existence and the location of the feed. In one embodiment, this input is received by clicking on a URL hyperlink of the feed's location. In another embodiment, this input is received by a user typing in or otherwise inputting the feed's location. In one embodiment, the feed and related images are located on a server accessible via the Internet. According to another embodiment, the server is a node in a peer-to-peer network.

In step 504, the feed is subscribed to in response to user input. In one embodiment, a dialog box or other GUI element is used to receive the user's preference whether to subscribe to the feed. In another embodiment, the feed is automatically subscribed to upon receiving the input of step 502. According to one embodiment, authentication information must be provided in order to subscribe to and download the feed and images.

In step 506, the feed is received, or downloaded and processed, in response to a user request. In one embodiment, the feed is automatically received upon the successful subscribing as in step 504.

In step 508, the digital image files described by the feed are caused to be downloaded from the server on which they are stored. According to one embodiment, the files are downloaded in the background, such that the user may continue working while the files are being downloaded. According to an embodiment, the downloading is in response to a user request, while in another embodiment the downloading is automatically initiated. There may be a progress indicator of some sort while the feed and images are being downloaded.

In step 510, the digital images downloaded from the server to the client are organized within the client. In one embodiment, the images are organized into collections as earlier described. In one embodiment, the images are automatically associated with the collection. In another embodiment, the collection may be automatically created at the import of the images, named by the user, and thereafter maintained by the user. In one embodiment, the user may add images from several different sources to the collection.

In step 512, the subscribed feed is monitored for modification. In one embodiment, the feed is monitored for modification after the initial feed is subscribed to. If the feed changes, such as by the publisher uploading a new feed after adding images to the collection, deleting images from the collection, or changing properties (size, brightness, crop area) of an image in the collection, then this modification is detected. According to an embodiment, the feed is monitored at regular intervals. In another embodiment, the modifications are detected immediately. In another embodiment, user input is received that causes the feed to be examined for modifications.

In step 514, the modified feed is received, or downloaded and processed, in response to a user request. In one embodiment, the modified feed is automatically received upon detecting a modification to the original feed.

In step 516, the digital image files identified by the modified feed are caused to be downloaded from the server on which they are stored. According to one embodiment, the files are downloaded in the background, such that the user may continue working while the files are being downloaded. According to an embodiment, the downloading is in response to a user request, while in another embodiment the downloading is automatically initiated. A progress indicator may be displayed during the downloading.

According to an embodiment, only image files determined to be new or modified are downloaded, in order to save transmission bandwidth.

According to an embodiment, after downloading and processing the updated feed along with the described images, the system returns to step 512, and steps 514 and 516 are repeated whenever modifications are detected to the feed.

Figure 6:
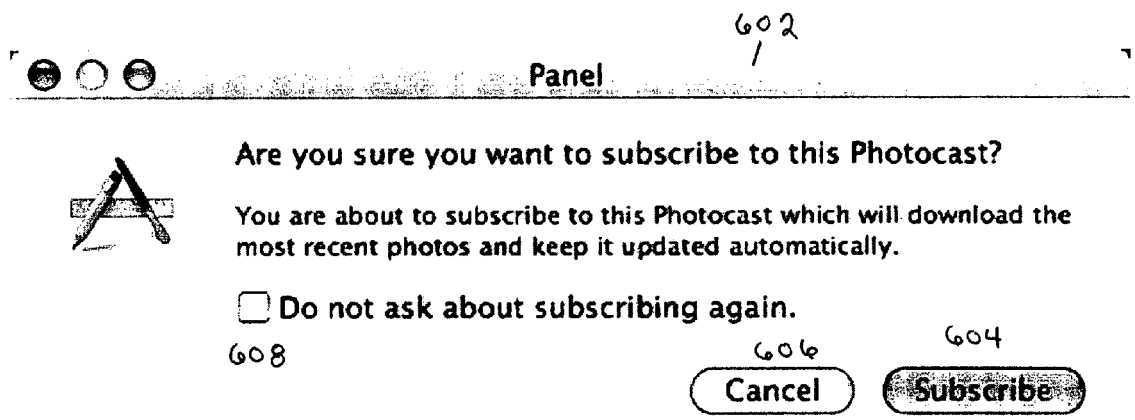
FIG. 6 is a block diagram illustrating an embodiment of the invention.

FIG. 6 illustrates an embodiment of the invention utilizing the iPhoto software package, as described earlier, but it should be understood that the techniques described herein may be embodied in other software that runs on the personal computer.

In FIG. 6, a user has received a first input indicating the feed, or "Photocast." According to an embodiment, this input is received by clicking on a URL hyperlink of the feed's location. In response, feedback is generated to the user requesting confirmation that the user wishes to subscribe to the feed. This feedback may take the form of a GUI element, such as the dialog box 602 illustrated in FIG. 2. The dialog box alerts the user that they are about to subscribe to a feed and asks for confirmation. If the user desires to subscribe to the feed, the user may click on the "Subscribe" button 604. The user may click on the "Cancel" button 606 if the user does not wish to subscribe to the feed.

According to an embodiment, input may be received 608 that will cause this step to be bypassed on future occasions when feeds are discovered.

Figure 7:
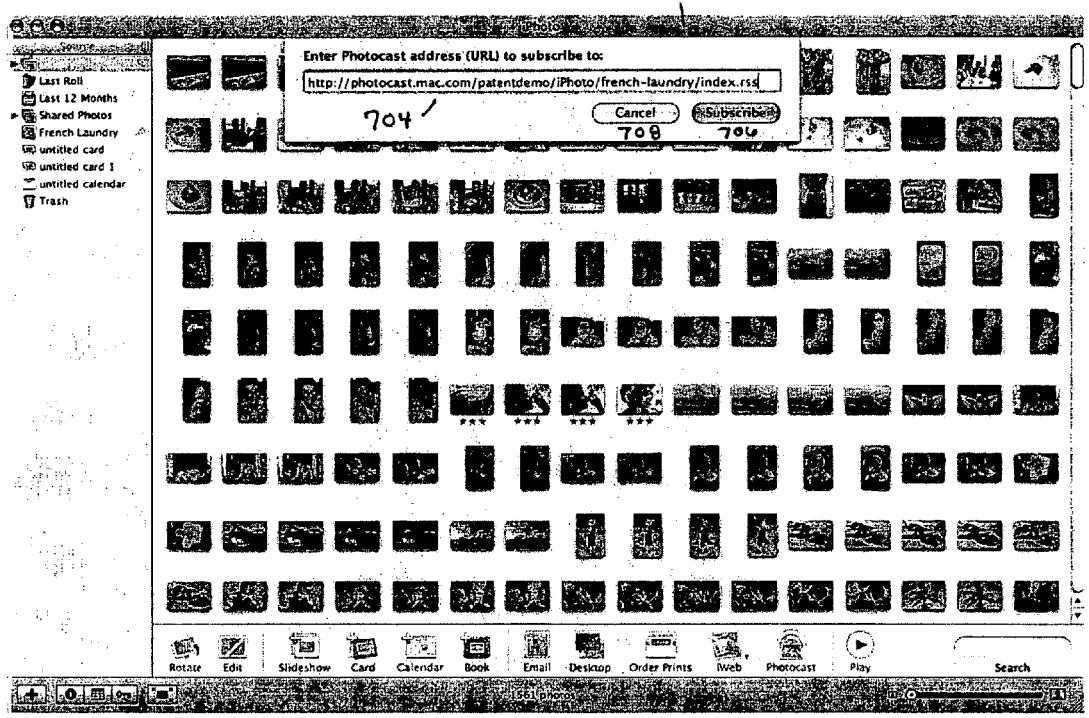
FIG. 7 is a block diagram illustrating an embodiment of the invention.

FIG. 7 illustrates an embodiment of the invention utilizing the iPhoto software package, as described earlier, but it should be understood that the techniques described herein may be embodied in other software that runs on the personal computer.

In FIG. 7, this input is received by a user typing in or otherwise inputting the feed's location. A dialog box 702 or other GUI element well known in the art is provided, within which a user may input the URL 704 of the feed to which the user desires to subscribe. If the user desires to subscribe to the feed, the user may click on the "Subscribe" button 706. The user may click on the "Cancel" button 708 if the user does not wish to subscribe to the feed.

Figure 8:
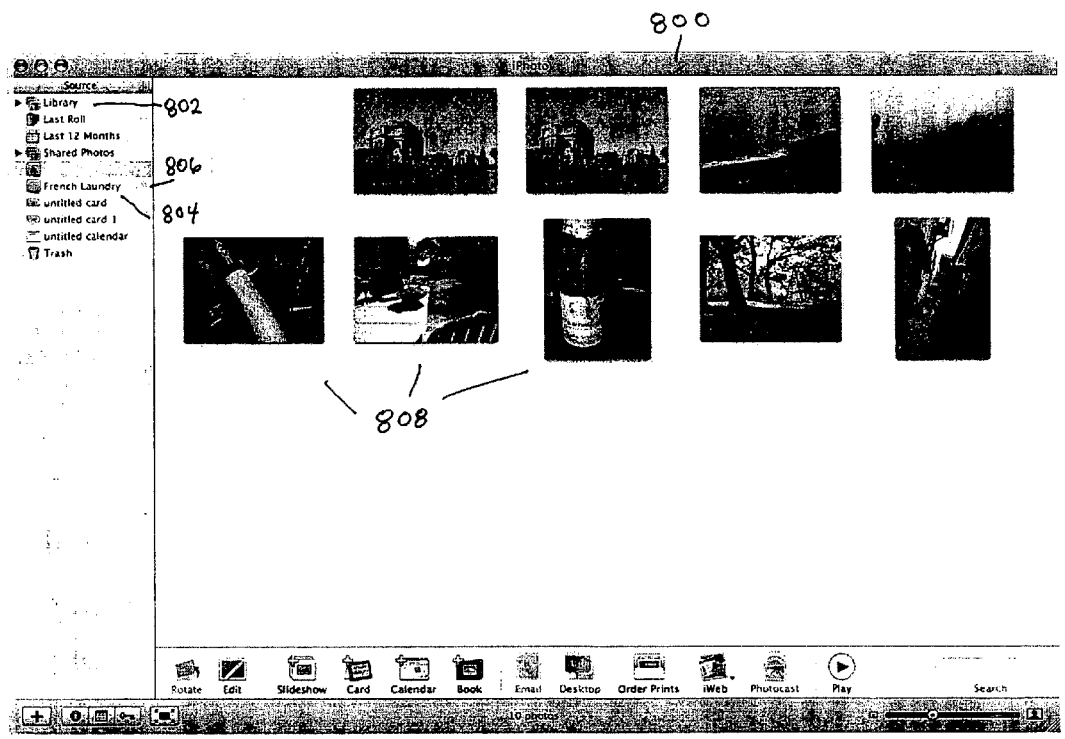
FIG. 8 is a block diagram illustrating an embodiment of the invention.

FIG. 8 illustrates an embodiment of the invention utilizing the iPhoto software package, as described earlier, but it should be understood that the techniques described herein may be embodied in other software that runs on the personal computer.

In FIG. 8, the digital image system 800 maintains a list of organizational elements to aggregate images managed by the system. For example, the system in FIG. 8 contains a Library 802 comprising the entire number of images available for display at any given time. The system also contains collections of images, such as "French Laundry" 804. In this example, the "French Laundry" collection 804 was created upon the user subscribing to the "French Laundry" feed as earlier described, and downloading the images described by the feed. According to an embodiment, a GUI element 806 is displayed next to the collection, indicating that the collection is comprises of images 808 from a Photocast feed. According to an embodiment, a user may click on the GUI element 806 to manually examine the feed on the server to detect whether the feed has been modified.

Hardware Overview

Figure 9:
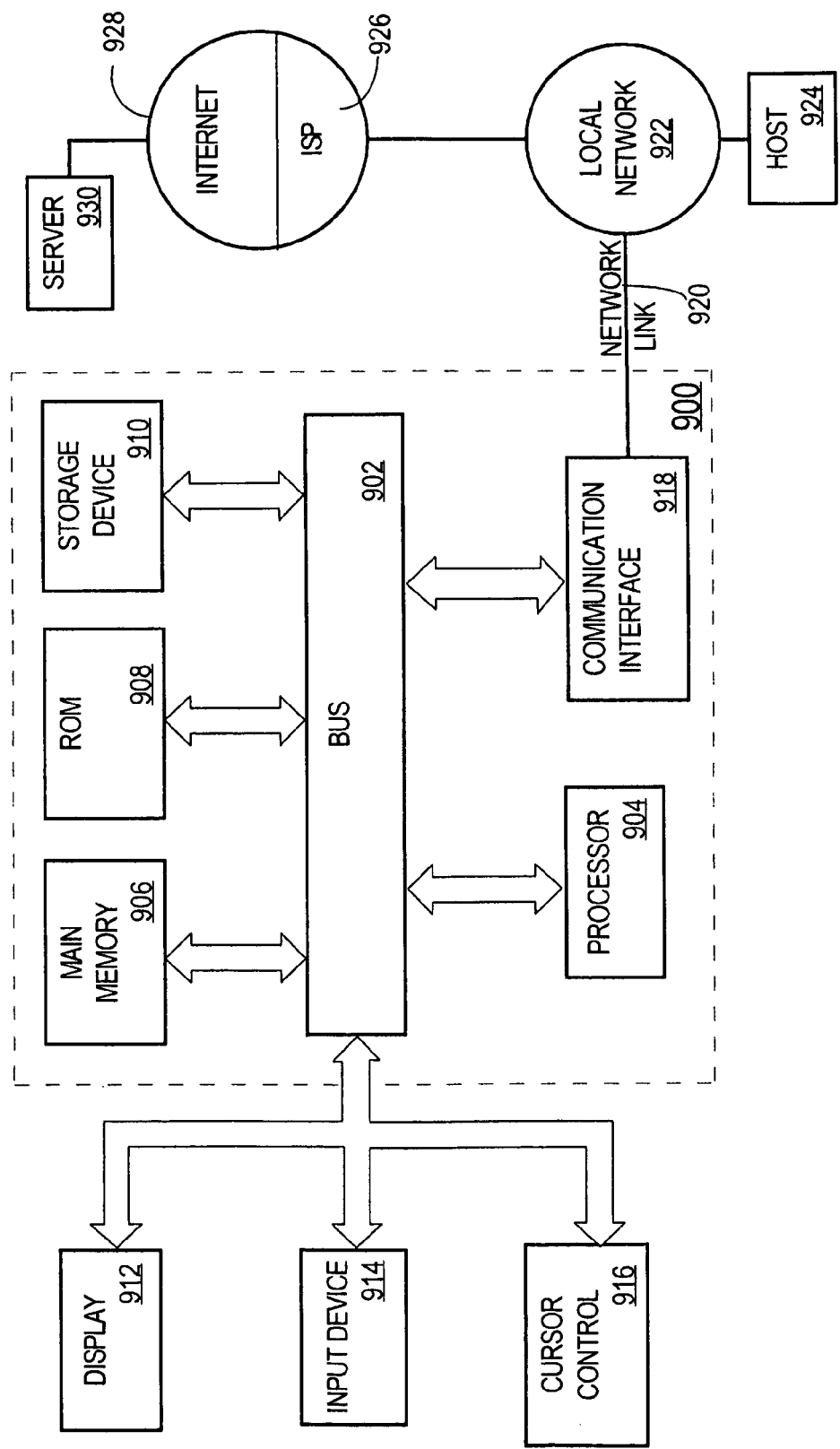
FIG. 9 is a block diagram of a computer system on which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving user input that indicates user intent to create, on a first client system, a collection having a user-specified name;
in response to the user input that indicates the user intent to create the collection, creating the collection having the user-specified name on the first client system;
receiving user input that indicates user intent to include, within the collection, a plurality of digital image files that are stored on the first client system but are not yet included within the collection;
in response to the user input that indicates the user intent to include the plurality of digital image files within the collection, including the plurality of digital image files within the collection;
publishing digital image files in the collection by causing the digital image files in the collection to be uploaded to a server from the first client system;
after publishing the digital image files in the collection, monitoring the collection on the first client system for an addition of digital image files;
while monitoring the collection on the first client system, detecting an addition, to the collection, of at least one digital image file that was stored on the first client system but not included within the collection prior to the addition of the at least one digital image file to the collection;
responsive to detecting the addition of the at least one digital image file to the collection on the first client system, causing the at least one digital image file to be uploaded to the server from the first client system;
wherein the method is performed by one or more computing devices.

2. The method of claim 1, further comprising:
monitoring the collection on the first client system for a deletion of digital image files;
while monitoring the collection on the first client system, detecting a deletion of one or more digital image files in the collection on the first client system;
responsive to detecting the deletion of the one or more digital image files in the collection on the first client system, causing deletion of one or more digital image files on the server that are copies of the deleted one or more digital image files in the collection on the first client system.

3. The method of claim 1, wherein causing the at least one digital image file to uploaded to the server from the first client system is automatically initiated without user input.

4. The method of claim 1, further comprising receiving user input specifying whether the uploading of additional digital image files in the collection are to be automatically initiated without user input.

5. The method of claim 1, further comprising publishing a feed listing the at least one digital image file in a syndicated content format, wherein the syndicated format is an XML compliant format.

6. The method of claim 1, wherein the server is a node in a peer-to-peer network.

7. The method of claim 1, further comprising publishing a feed listing the at least one digital image file, wherein the feed comprises authentication information.

8. The method of claim 7, further comprising:
in response to user input, automatically creating an e-mail message comprising the URL of the published feed and the authentication information.

9. The method of claim 7, further comprising:
receiving user input specifying a size for digital image files selected for publication; and
uploading the digital image files at the specified size.

10. The method of claim 1, further comprising:
receiving user input specifying a quality for digital image files selected for publication; and
uploading the digital image files at the specified quality.

11. The method of claim 1, further comprising:
providing user feedback, the feedback comprising the URL of the published feed.

12. The method of claim 1, further comprising causing uploading only digital image files that are new or altered in the collection.

13. The method of claim 1, further comprising:
uploading to the server a file, the file causing an identification to be made whether a client connected to the server possesses software compatible with a specific mode of operation; and
if a client possessing the compatible software connects to the server, causing the compatible software on the client to be executed.

14. The method of claim 1, further comprising:
receiving additional user input that indicates that digital image files in the collection are to be resized before being uploaded to the server;
wherein the step of causing the digital image files in the collection to be uploaded to the server from the first client system comprises automatically resizing the digital image files on the first client system by reducing a quantity of pixels in each of the digital image files prior to uploading resized digital image files to the server.

15. The method of claim 14, wherein the additional user input specifies dimensions, in pixels, to which the digital images files are to be resized.

16. The method of claim 14, wherein the user input specifies a selection of a particular size from a set of specified sizes, and wherein each size of the set of specified sizes represents a proportional scaling that retains height-to-width ratios of the digital image files while reducing pixel dimensions of the digital image files.

17. The method of claim 14, wherein the step of causing the digital image files in the collection to be uploaded to the server from the first client system comprises retaining, on the first client system, after said resizing, copies of the digital image files that have not been resized.

18. The method of claim 1, further comprising:
storing, on the server, a Javascript executable file which, when executed by a second client system, enables the second client system to subscribe to a feed that includes the plurality of digital image files within the collection.

19. The method of claim 18, wherein the server determines whether an operating system of the second client system is a particular type of operating system, and wherein the server sends a webpage referencing the executable file to the second client system in response to the server determining that the operating system of the second client system is the second type of operating system.

20. A non-transitory computer readable storage medium comprising instructions, which when executed by a processor cause performance of steps comprising:
receiving user input that indicates user intent to create, on a first client system, a collection having a user-specified name;
in response to the user input that indicates the user intent to create the collection, creating the collection having the user-specified name on the first client system;
receiving user input that indicates user intent to include, within the collection, a plurality of digital image files that are stored on the first client system but are not yet included within the collection;
in response to the user input that indicates the user intent to include the plurality of digital image files within the collection, including the plurality of digital image files within the collection;
publishing digital image files in the collection by causing the digital image files in the collection to be uploaded to a server from the first client system;
after publishing the digital image files in the collection, monitoring the collection on the first client system for an addition of digital image files;
while monitoring the collection on the first client system, detecting an addition, to the collection, of at least one digital image file that was stored on the first client system but not included within the collection prior to the addition of the at least one digital image file to the collection;
responsive to detecting the addition of the at least one digital image file to the collection on the first client system, causing the at least one digital image file to be uploaded to the server from the first client system.

21. The non-transitory computer readable storage medium of claim 20, the steps further comprising:
monitoring the collection on the first client system for a deletion of digital image files;
while monitoring the collection on the first client system, detecting a deletion of one or more digital image files in the collection on the first client system;
responsive to detecting the deletion of the one or more digital image files in the collection on the first client system, causing deletion of one or more digital image files on the server that are copies of the deleted one or more digital image files in the collection on the first client system.

22. The non-transitory computer readable storage medium of claim 20, wherein causing the at least one digital image file to uploaded to the server from the first client system is automatically initiated without user input.

23. The non-transitory computer readable storage medium of claim 20, wherein the server is a node in a peer-to-peer network.

24. The non-transitory computer readable storage medium of claim 20, wherein the steps further comprise:
receiving additional user input that indicates that digital image files in the collection are to be resized before being uploaded to the server;

wherein the step of causing the digital image files in the collection to be uploaded to the server from the first client system comprises automatically resizing the digital image files on the first client system by reducing a quantity of pixels in each of the digital image files prior to uploading resized digital image files to the server.

25. The non-transitory computer readable storage medium of claim 24, wherein the additional user input specifies dimensions, in pixels, to which the digital images files are to be resized.

26. The non-transitory computer readable storage medium of claim 24, wherein the user input specifies a selection of a particular size from a set of specified sizes, and wherein each size of the set of specified sizes represents a proportional scaling that retains height-to-width ratios of the digital image files while reducing pixel dimensions of the digital image files.

27. The non-transitory computer readable storage medium of claim 20, wherein the step of causing the digital image files in the collection to be uploaded to the server from the first client system comprises retaining, on the first client system, after said resizing, copies of the digital image files that have not been resized.

28. The non-transitory computer readable storage medium of claim 20, wherein the steps further comprise:
storing, on the server, a Javascript executable file which, when executed by a second client system, enables the second client system to subscribe to a feed that includes the plurality of digital image files within the collection.

29. The non-transitory computer readable storage medium of claim 28, wherein the server determines whether an operating system of the second client system is a particular type of operating system, and wherein the server sends a webpage referencing the executable file to the second client system in response to the server determining that the operating system of the second client system is the second type of operating system.

* * * * *